US011340086B2

United States Patent
Jang (10) Patent No.: US 11,340,086 B2
(45) Date of Patent: May 24, 2022

(54) APPARATUS FOR PROVIDING ROUTE BASED ON ESTIMATED WEIGHT OF ELECTRIC VEHICLE AND METHOD THEREOF

(71) Applicants: HYUNDAI MOTOR COMPANY, Seoul (KR); KIA MOTORS CORPORATION, Seoul (KR)

(72) Inventor: Do Youn Jang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 37 days.

(21) Appl. No.: 16/901,652

(22) Filed: Jun. 15, 2020

(65) Prior Publication Data
US 2021/0180968 A1    Jun. 17, 2021

(30) Foreign Application Priority Data
Dec. 16, 2019    (KR) .................... 10-2019-0167606

(51) Int. Cl.
*G01C 21/34* (2006.01)
*B60W 40/13* (2012.01)
(Continued)

(52) U.S. Cl.
CPC ......... *G01C 21/3469* (2013.01); *B60W 40/13* (2013.01); *G01C 21/3697* (2013.01);
(Continued)

(58) Field of Classification Search
CPC ......... B60W 40/13; B60W 2510/1005; B60W 2552/15; B60W 2510/083;
(Continued)

(56) References Cited

U.S. PATENT DOCUMENTS

2015/0112526 A1*  4/2015  Martin ............... G01C 21/3469
                                                         701/22
2016/0114808 A1*  4/2016  Mellinger ............. B60W 40/12
                                                         701/123
(Continued)

FOREIGN PATENT DOCUMENTS

JP       2000-292185 A     10/2000

OTHER PUBLICATIONS

Wang Tan-li,, Chen Chang-hong, Gao Shi-zhan, ,Li Xing-quan1 Dynamic performance of a pure electric vehicle experimental analysis, 2012, College of Automobile and Transportation Engineering, pp. 3-6 (Year: 2012).*

(Continued)

*Primary Examiner* — Aniss Chad
*Assistant Examiner* — Chase L Cooley
(74) *Attorney, Agent, or Firm* — McDonnell Boehnen Hulbert & Berghoff LLP (57) ABSTRACT

An apparatus for providing a route of an electric vehicle and a method thereof are provided. The apparatus includes a processor that estimates a weight of a vehicle when guiding a user along a route to a destination, calculates a driving load for each route section using the estimated weight of the vehicle, calculates a driving force using motor torque, and determines a probability of hill climbing for each route section using the driving force and the driving load and a display that is controlled by the processor to display at least one of a driving load for each route section or a probability of hill climbing according to a driving force for each route section.

20 Claims, 9 Drawing Sheets

(51) Int. Cl.
*G01C 21/36* (2006.01)
*G07C 5/02* (2006.01)

(52) U.S. Cl.
CPC ........... *G07C 5/02* (2013.01); *B60W 2300/12* (2013.01); *B60W 2510/083* (2013.01); *B60W 2510/1005* (2013.01); *B60W 2530/20* (2013.01); *B60W 2552/15* (2020.02); *G01C 21/367* (2013.01)

(58) Field of Classification Search
CPC . B60W 2530/20; B60W 2300/12; G07C 5/02; G08G 1/0969; G01C 21/3429; G01C 21/3697; G01C 21/367; G01C 21/3461; G01C 21/3446; G01C 21/3492

See application file for complete search history.

(56) References Cited

U.S. PATENT DOCUMENTS

| | | | |
|---|---|---|---|
| 2016/0195407 A1* | 7/2016 | Sasaki | G08G 1/0962 |
| | | | 701/36 |
| 2020/0072627 A1* | 3/2020 | Jung | B60L 53/665 |

OTHER PUBLICATIONS https://x-engineer.org/automotive-engineering/vehicle/electric-vehicles/ev-design-electric-motors/, EV design—electric motors, Jun. 19, 2019, X-Engineer (Year: 2019).*

Ion Preda, Dinu Covaciu, Gheorghe Ciolan, Coast Down Test—Theoretical and Experimental Approach, 2010, Transilvania University of Brasov, Romania, pp. 155-158 (Year: 2010).* http://www.thecartech.com/subjects/auto_eng/Tractive Effort.htm, Tractive Effort (TE) and Tractive Resistance (TR), 2018, CarTech.com (Year: 2018).*

* cited by examiner

APPARATUS FOR PROVIDING ROUTE BASED ON ESTIMATED WEIGHT OF ELECTRIC VEHICLE AND METHOD THEREOF

CROSS REFERENCE TO RELATED APPLICATIONS

This application claims the benefit of priority to Korean Patent Application No. 10-2019-0167606, filed in the Korean Intellectual Property Office on Dec. 16, 2019, the entire contents of which are incorporated herein by reference.

TECHNICAL FIELD

The present disclosure relates to an apparatus for providing a route based on an estimated weight of an electric vehicle and a method thereof, and more particularly, relates to technologies of guiding a user along an optimal route according to a weight of a commercial electric vehicle.

BACKGROUND

Unlike a general internal combustion engine vehicle, an electric vehicle travels using energy of the battery. Thus, a driving distance is determined according to battery performance and capacity. Accuracy of a distance to empty (DTE) displayed on a cluster when the driver rides in the vehicle to start is important.

For an internal combustion engine vehicle, because a gas station infrastructure is good, it is possible for the internal combustion engine vehicle to be filled with gasoline always when it should be filled with gasoline and a time to fill the internal combustion engine vehicle with gasoline is short. However, for an electric vehicle, because a gas station infrastructure is still insufficient and because a time taken to be filled with electricity is longer than the time taken to be filled with gasoline, information capable of enabling the electric vehicle to move to an accurate destination is important.

Thus, it is important to analyze accurate battery energy, a driving load, a usual driving pattern of a driver, and the like and accurately provide DTE information. A DTE is provided to the driver using various technologies.

However, because there may be a large difference in fuel consumption according to cargo capacity, a total weight (vehicle weight+cargo capacity) of the vehicle may have an influence on a DTE.

Furthermore, an existing technology receives information about a road driving load consumed to a destination using high definition map information and provides an Eco-route capable of using the least energy. In this case, because the existing technology has no consideration for gradient information of the road and a weight of the vehicle, it is difficult for the existing technology to provide an accurate DTE.

SUMMARY

The present disclosure has been made to solve the above-mentioned problems occurring in the prior art while advantages achieved by the prior art are maintained intact.

An aspect of the present disclosure provides an apparatus for providing a route based on an estimated weight of an electric vehicle to predict a probability of hill climbing for each route section by estimating a weight of a commercial electric vehicle and guiding a user along an optimal driving route depending on the probability and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for providing a route of an electric vehicle may include: a processor that estimates a weight of a vehicle when guiding a user along a route to a destination, calculates a driving load for each route section using the estimated weight of the vehicle, calculates a driving force using motor torque, and determines a probability of hill climbing for each route section using the driving force and the driving load and a display that is controlled by the processor to display at least one of a driving load for each route section or a probability of hill climbing according to a driving force for each route section.

In an embodiment, the processor may generate a recommended route based on road information and current battery information of the vehicle when the destination is input and may guide the user along the generated recommended route.

In an embodiment, the processor may estimate the weight of the vehicle using a driving resistance value when the vehicle coasts down and acceleration of the vehicle, when the vehicle starts to drive.

In an embodiment, the processor may extract grade information of the route based on a high definition map.

In an embodiment, the processor may determine whether it is possible to drive to the destination, based on road information, battery information, and vehicle weight information.

In an embodiment, the processor may calculate the driving load for each route section using the grade information and the estimated weight of the vehicle, when it is possible to drive to the destination.

In an embodiment, the processor may calculate the driving force for each route section using maximum torque which is motor torque mapped to a battery available output based on a battery output map.

In an embodiment, the processor may calculate the driving force using the maximum torque, a dynamic tire radius, and a gear ratio.

In an embodiment, the processor may compare the driving force with the driving load per route composed of at least one section to determine the probability of hill climbing for each route section.

In an embodiment, the processor may determine that it is possible to perform hill climbing when the driving force is greater than the driving load and may determine a corresponding section as a route where it is impossible to perform hill climbing when the driving force is less than or equal to the driving load.

In an embodiment, the display may separately display at least one section included in the route to the destination and may display at least one of a driving force or a driving load in a numeric value per section.

In an embodiment, the display may separately display at least one section included in the route to the destination and may separately display a state where the output is insufficient, a state where the output is equal, and a state where the output is sufficient.

According to another aspect of the present disclosure, a method for providing a route of an electric vehicle may include: estimating a weight of a vehicle, when guiding a user along a route to a destination, calculating a driving load for each route section using the estimated weight of the vehicle and grade information, calculating a driving force using motor torque, determining a probability of hill climbing for each route section based on the driving load and the driving force and, and displaying at least one of a driving load for each route section or a probability of hill climbing according to a driving force for each route section.

In an embodiment, the estimating of the weight of the vehicle may include estimating the weight of the vehicle using a driving resistance value when the vehicle coasts down and acceleration of the vehicle, when the vehicle starts to drive.

In an embodiment, the method may further include generating a recommended route based on road information and current battery information of the vehicle when the destination is input and guiding the user along the generated recommended route and determining whether it is possible to drive to the destination, based on road information, battery information, and vehicle weight information.

In an embodiment, the calculating of the driving load may include extracting grade information of the route based on a high definition map and calculating the driving load for each route section using the grade information and the estimated weight of the vehicle, when it is possible to drive to the destination.

In an embodiment, the calculating of the driving force may include calculating the driving force for each route section using maximum torque which is motor torque mapped to a battery available output based on a battery output map.

In an embodiment, the determining of the probability of hill climbing for each route section may include comparing the driving force with the driving load per route composed of at least one section to determine the probability of hill climbing for each route section.

In an embodiment, the displaying of the probability of hill climbing may include separately displaying at least one section included in the route to the destination and displaying at least one of a driving force or a driving load in a numeric value per section.

In an embodiment, the displaying of the probability of hill climbing may include separately displaying at least one section included in the route to the destination and separately displaying a state where the output is insufficient, a state where the output is equal, and a state where the output is sufficient.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, a description will be given in detail of embodiments of the present disclosure with reference to FIGS. 1 and 9.

Figure 1:
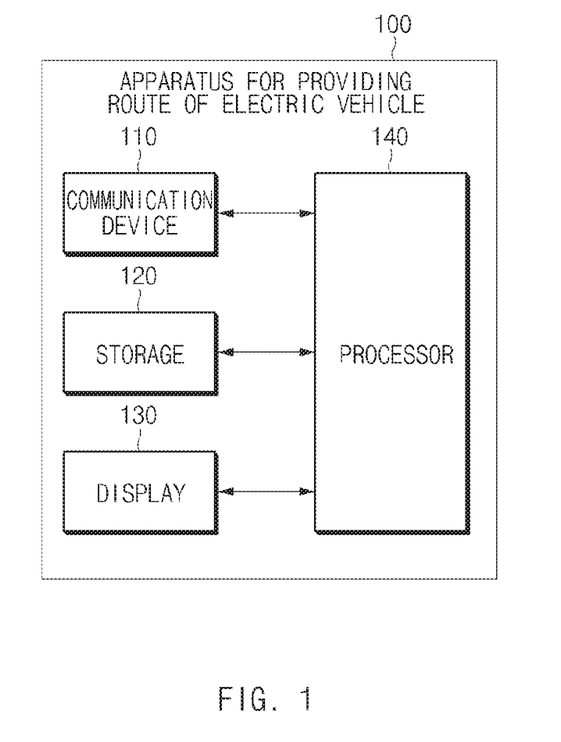
FIG. 1 is a block diagram illustrating a configuration of a vehicle system including an apparatus for providing a route of an electric vehicle according to an embodiment of the present disclosure.

FIG. 1 is a block diagram illustrating a configuration of a vehicle system including an apparatus for providing a route of an electric vehicle according to an embodiment of the present disclosure.

Referring to FIG. 1, an apparatus 100 for providing a route of an electric vehicle according to an embodiment of the present disclosure may estimate a weight of the vehicle when guiding a user along a route to a destination, may calculate a driving load for each route section using the estimated weight of the vehicle, may calculate a driving force using motor torque by a battery output map, and may determine a probability of hill climbing for each route section by comparing the driving force with the driving load.

The apparatus 100 for providing the route of the electric vehicle may include a communication device 110, a storage 120, a display 130, and a processor 140.

The communication device 110 may be a hardware device implemented with various electronic circuits to transmit and receive a signal through a wireless or wired connection. In an embodiment of the present disclosure, the communication device 110 may perform inter-vehicle communication through controller area network (CAN) communication, local interconnect network (LIN) communication, Ethernet communication, or the like.

The storage 120 may store a battery output map mapping a battery available output and motor torque and may store a driving force, a driving load, and the like calculated by the processor 140. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 130 may be controlled by the processor 140 to display at least one of a driving load for each route section or a probability of hill climbing according to a driving force for each route section.

The display 130 may separately display at least one sections included in a route to a destination and may display at least one of a driving force or a driving load in a numeric value per section.

The display 130 may separately display at least one section included in the route to the destination and may separately display a state when the output is insufficient, a state where the output is equal, and a state where the output is sufficient.

The display 130 may include an input means for receiving a control command from a user and an output means for outputting an operation state and result or the like of the apparatus 100. Herein, the input means may include a key button and may further include a mouse, a joystick, a jog-shuttle, a stylus pen, or the like. Furthermore, the input means may further include a soft key implemented on a display. The output means may include the display and may further include a sound output means such as a speaker. In this case, when a touch sensor such as a touch film, a touch sheet, or a touch pad is provided in the display, the display may operate as a touchscreen and may be implemented in a form where the input means and the output means are integrated with each other. In an embodiment of the present disclosure, a destination may be input through the input means, and the output means may display a route to the destination for each section or may display whether there is a probability of hill climbing for each route section in various manners.

In this case, the display may include at least one of a liquid crystal display (LCD), a thin film transistor-LCD (TFT-LCD), an organic light-emitting diode (OLED) display, a flexible display, a field emission display (FED), and/or a three-dimensional (3D) display.

The processor 140 may be electrically connected with the communication device 110, the storage 120, the display 130, or the like and may electrically control the respective components. The processor 140 may be an electrical circuit which executes instructions of software and may perform a variety of data processing and calculation described below. The processor 140 may be implemented as a vehicle control unit (VCU).

When a destination is input, the processor 140 may generate a recommended route based on road information and current battery information of the vehicle and may guide the user along the recommended route. In this case, the road information may be obtained from a high definition map stored in a navigation device or the like and may include a driving load value of a corresponding road. The current battery information may include a state of charge (SOC) of a battery, a battery temperature, or the like and may be obtained from a battery management system (BMS).

When the vehicle starts to drive, the processor 140 may estimate a weight of the vehicle using a driving resistance value when the vehicle coasts down and acceleration of the vehicle. In this case, the driving resistance value may be a value obtained when the vehicle coasts down and refers to a driving resistance value of the vehicle for driving drag obtained until the vehicle speed decreases to 0 kph after the gear shift changes to the N-range during high-speed driving and an aerodynamic force. The processor 140 may calculate a vehicle weight as Equation 1 below.

$$m = \frac{\int_{t0}^{t1} \left[ \frac{\eta_{RD}}{r_{tire}} (\tau_{Mot}^{BeAj}) - (f_0 + f_1 v + f_2 v^2) \right] dt}{\left[ \Delta v + \int_{t0}^{t1} g \sin\theta dt \right]} \quad \text{[Equation 1]}$$

In Equation 1 above, the weight m may be derived from a value obtained by dividing the acceleration a by the force F. $\eta_{RD}$ denotes the decelerator efficiency, $r_{tire}$ denotes the dynamic tire radius, $\tau_{Mot}^{BeAj}$ denotes the motor torque, and $f_0$, $f_1$, $f_2$ denote the driving resistance values. In this case, the driving resistance values $f_0$, $f_1$, $f_2$ are vehicle driving resistance values obtained when the vehicle coasts down.

The processor 140 may extract grade information of the route based on Google Earth or a high definition map and may determine whether it is possible to drive to a destination based on road information, battery information, and vehicle weight information. In other words, when destination information is input from a driver via the input means, the processor 140 may determine whether it is possible to drive to the destination using current battery information of the vehicle (e.g., the remaining capacity of the battery), road information (e.g., a corresponding route load of the high definition map or a distance to the destination), or a current weight (e.g., a current weight estimated as a weight). In this case, the processor 140 may obtain grade information based on information such as longitude, latitude, an altitude, or whether there is a tunnel, on the Google Earth or the high definition map.

When it is possible to drive to the destination, the processor 140 may calculate a driving load of the vehicle for each route section using the vehicle weight m and the grade information θ. An equation of calculating the driving load may be Equation 2 below.

$$F = \frac{1}{2} \rho A C_{drag} V^2 \text{(air resistance)} + \quad \text{[Equation 2]}$$
$$g \cos\theta x C_{roll} \text{(cloud resistance)} +$$
$$mg\sin\theta \text{(gradient resistance)}$$

Here, F denotes the driving load, ρ denotes the friction coefficient, A denotes the cross-sectional area, and $C_{drag}$ denotes the air resistance coefficient, V denotes the vehicle speed, $C_{roll}$ denotes the cloud resistance coefficient, m denotes the weight, and g denotes the gravitational acceleration.

The processor 140 may calculate a driving force for each route section using maximum torque which is motor torque mapped to a battery available output based on the battery output map. In other words, the processor 140 may identify a battery available output in a start SOC from the battery output map stored in the storage 120 and may obtain motor torque (maximum torque) mapped to the battery available output.

$$\text{Driving force } DF = \text{Motor torque} * \text{gear ratio} / \text{dynamic radius} \qquad \text{[Equation 3]}$$

In Equation 3 above, the processor 140 may calculate a driving force using maximum torque, a dynamic tire radius, and a gear ratio.

The processor 140 may compare a driving force with a driving load per route composed of at least one section to determine a probability of hill climbing for each route section.

When the driving force is greater than the driving force, the processor 140 may determine that it is possible for a corresponding section to perform hill climbing in a corresponding section. When the driving force is less than or equal to the driving force, the processor 140 may determine a corresponding section as a route where it is impossible to perform hill climbing and may exclude the route where it is impossible to perform hill climbing from the driving route to guide the user along an optimal route.

Furthermore, the processor 140 may calculate energy used for each route section and may display the energy used for each route section on the display 130. In other words, the processor 140 may multiply a rate of fuel consumption according to a vehicle weight by a remaining driving distance to a destination to calculate an amount kW of battery actually used and may subtract a used SOC from a departure SOC to calculate a start SOC of a next section.

When calculating expected consumption of energy to a destination using driving load information of a driving road based on a high definition map and guiding the user along a route where the expected consumption of energy is small, because a difference in expected consumption of energy by a vehicle weight is large, an embodiment of the present disclosure may estimate a vehicle weight and may determine whether it is possible for the vehicle to drive to the destination, using road information (e.g., road information on the high definition map), battery information (e.g., the amount of SOC provided from the battery management system (BMS), a battery output map according to a battery temperature, or the like), or the estimated vehicle weight.

Furthermore, although it is possible for the vehicle to drive to the destination, an embodiment of the present disclosure may accurately calculate a current driving load of the vehicle using grade information and a vehicle weight, may calculate a driving force using maximum torque based on the battery output map, and may compare the driving force with the driving load to accurately determine a probability of hill climbing for each route section.

Figure 2:
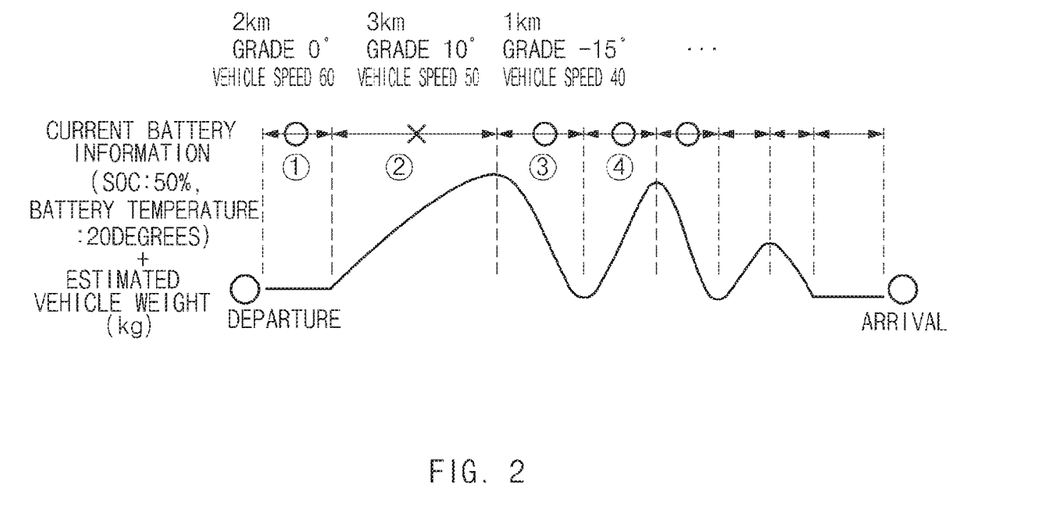
FIG. 2 is a drawing illustrating an example of displaying information about a probability of hill climbing for each section according to an embodiment of the present disclosure.

FIG. 2 is a drawing illustrating an example of displaying information about a probability of hill climbing for each section according to an embodiment of the present disclosure. Referring to FIG. 2, an embodiment is exemplified as a route from a departure point to a destination point is divided into a plurality of sections and a distance, a grade, and a vehicle speed of each section are displayed on the route.

In this case, current battery information (e.g., an SOC or/and a battery temperature) and an estimated vehicle weight value may be displayed together, and the vehicle weight value and a probability of hill climbing according to a grade may be displayed for each section.

Figure 3:
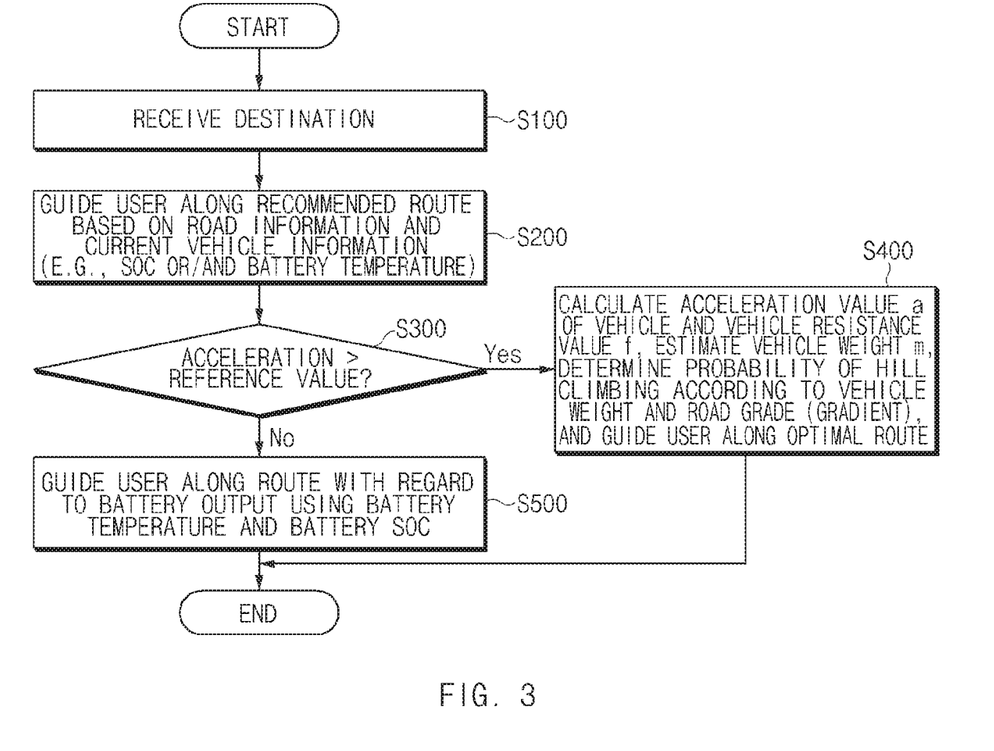
FIG. 3 is a flowchart illustrating a method for guiding a user along an optimal route by estimating a weight and predicting a probability of hill climbing according to an embodiment of the present disclosure.
Figure 4:
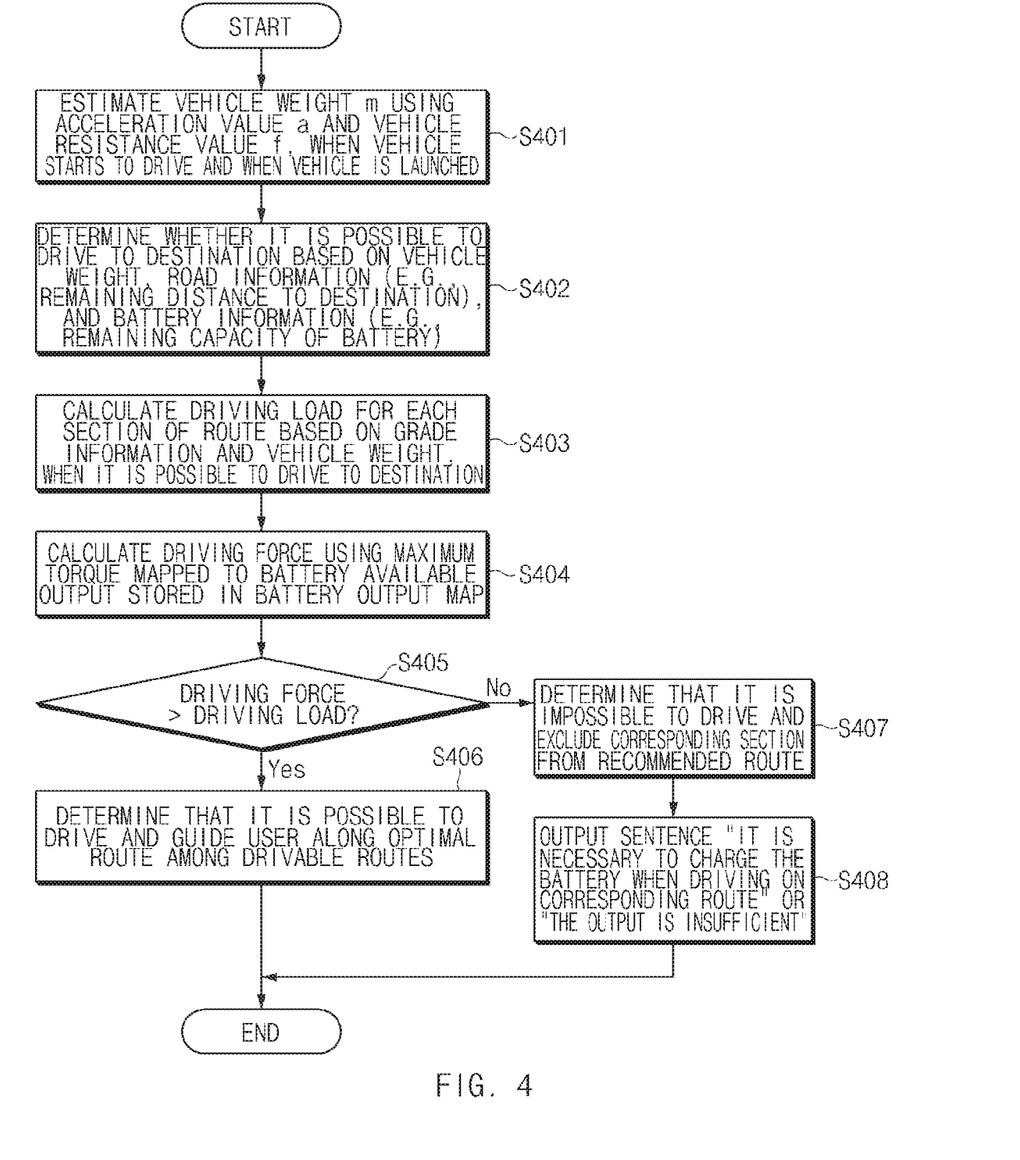
FIG. 4 is a flowchart illustrating in detail a method for guiding a user along an optimal route with regard to a battery output of FIG. 3.
Figure 5:
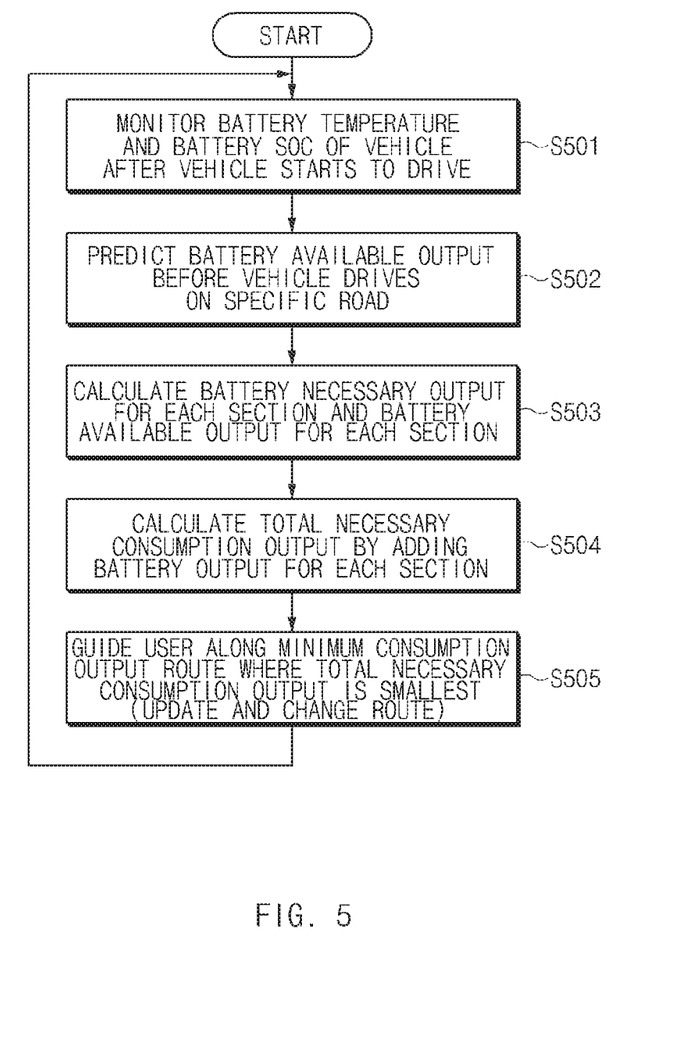
FIG. 5 is a flowchart illustrating a method for guiding a user along an optimal route depending on a weight estimated in FIG. 3 and a road gradient.

A description will be given in detail of a method for providing a route of an electric vehicle by estimating a weight and predicting a probability of hill climbing according to an embodiment of the present disclosure. FIG. 3 is a flowchart illustrating a method for guiding a user along an optimal route by estimating a weight and predicting a probability of hill climbing according to an embodiment of the present disclosure. FIG. 4 is a flowchart illustrating in detail a method for guiding a user along an optimal route with regard to a battery output of FIG. 3. FIG. 5 is a flowchart illustrating a method for guiding a user along an optimal route depending on a weight estimated in FIG. 3 and a road gradient.

Hereinafter, it is assumed that an apparatus 100 for providing a route of an electric vehicle performs a process of FIGS. 3 to 5. Furthermore, in a description of FIGS. 3 to 5, an operation described as being by an apparatus may be understood as being controlled by a processor 140 of the apparatus 100 for providing the route of the electric vehicle.

Referring to FIG. 3, in S100, the apparatus may receive a destination from a user to generate a route.

In S200, the apparatus may guide a user along a recommended route drivable to a destination using current remaining capacity of the battery based on road information (e.g., road information on a high definition map) and current vehicle information (e.g., a current SOC, a battery information, or the like). In this case, the apparatus may predict a battery output necessary for each route section depending on a load for each route section, may calculate a battery available output of each route using current information of the vehicle, and may exclude a section where an available output is insufficient for a necessary output to guide the user along an optimal route.

In S300, the apparatus may check whether acceleration of the vehicle is greater than a reference value to determine whether the vehicle starts to travel.

When the acceleration of the vehicle is greater than the reference value, in S400, the apparatus may estimate a vehicle weight m using an acceleration value a of the vehicle and a vehicle driving resistance value based on coastdown and may determine a probability of hill climbing according to the vehicle weight m and a grade (a road gradient) to guide the user along an optimal route with the probability of hill climbing. In other words, the apparatus may apply formula m=F/a using a force F (launch torque−driving load) generated while the vehicle is traveling and an acceleration value a generated while the vehicle is accelerating to estimate a total weight m of the vehicle.

In this case, the apparatus may calculate torque output when a driver currently steps on an accelerator pedal to drive, using launch torque of the vehicle, that is, motor torque, a gear ratio, and driving efficiency information and may calculate a driving load using a coastdown value which is a vehicle driving resistance value when the vehicle coasts down. Furthermore, the apparatus may estimate a weight of the vehicle based on Equation 1 above using an acceleration value of the vehicle.

The apparatus may know a current weight of the vehicle (a total weight including cargo of the vehicle) and may calculate a recommended route using the vehicle weight to correct a battery output.

On the other hands, when the acceleration of the vehicle is less than or equal to the reference value, in S500, the apparatus may guide the user along a route with regard to a battery output using the battery temperature and the battery SOC without estimating a vehicle weight.

Hereinafter, a description will be given in detail of a method (S400) for guiding the user along a route of the vehicle by estimating a weight in FIG. 3, as shown in FIG. 4.

After the vehicle starts to drive, when the vehicle is launched, in S401, the apparatus may estimate a vehicle weight "m" using an acceleration value "a" and a vehicle driving resistance value "f."

The apparatus may determine whether it is possible to drive to a destination based on the vehicle weight, road information (e.g., a remaining distance to the destination), and battery information (e.g., remaining capacity of the battery) in S402.

In S403, when it is possible to drive to the destination, the apparatus may calculate a driving load for each section of a route using grade information and the vehicle weight m. In this case, the apparatus may calculate the driving load using the vehicle weight and the grade information, using Equation 2 above.

In S404, the apparatus may calculate a driving force using the estimated vehicle weight m and maximum torque (motor torque). In this case, the apparatus may identify maximum torque (motor torque) mapped to a battery available output stored in a battery output map and may calculate a driving force DF using the maximum torque, a gear ratio, and a dynamic tire radius like Equation 3 above.

In S405, the apparatus may determine whether the driving force is greater than the driving load.

When the driving force is greater than the driving load, in S406, the apparatus may determine that it is possible to drive and may guide the user along an optimal route among drivable routes. In other words, when the driving force is greater than the driving load, the apparatus may determine a corresponding section as a route where it is possible to perform hill climbing.

On the other hand, when the driving force is less than or equal to the driving load, in S407, the apparatus may determine a corresponding section as a route where it is impossible to perform hill climbing and may determine that it is impossible to drive to exclude the corresponding section from the recommend route.

Figure 6:
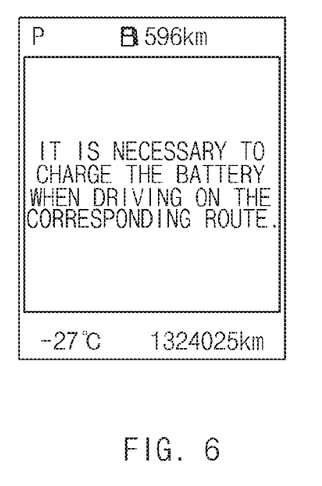
FIG. 6 is a drawing illustrating words of guidance indicating that it is necessary to charge the battery when guiding the user along a route, according to an embodiment of the present disclosure.

In S408, the apparatus may output the sentence "It is necessary to charge the battery when traveling the corresponding route" or "the output is insufficient" as shown in FIG. 6. FIG. 6 is a drawing illustrating words of guidance indicating that it is necessary to charge the battery when guiding the user along a route, according to an embodiment of the present disclosure. In this case, such words of guidance may be output on a cluster, a navigation device, an audio, video, navigation (AVN) device, or the like.

Hereinafter, a description will be given in detail of a method (S500) of guiding the user along a route based on a battery output using a battery temperature and a battery SOC in FIG. 3, as shown in FIG. 5.

In S501, after the vehicle starts to drive, the apparatus may monitor a battery temperature and a battery SOC of the vehicle.

In S502, the apparatus may predict a battery available output before the vehicle travels on a specific road.

In S503, the apparatus may calculate a battery necessary output for each section and a battery available output for each section.

In S504, the apparatus may calculate a total necessary consumption output by adding a battery output for each section.

In S505, the apparatus may guide the user along a minimum consumption output route where the total necessary consumption output is smallest (update and change the route).

Figure 7:
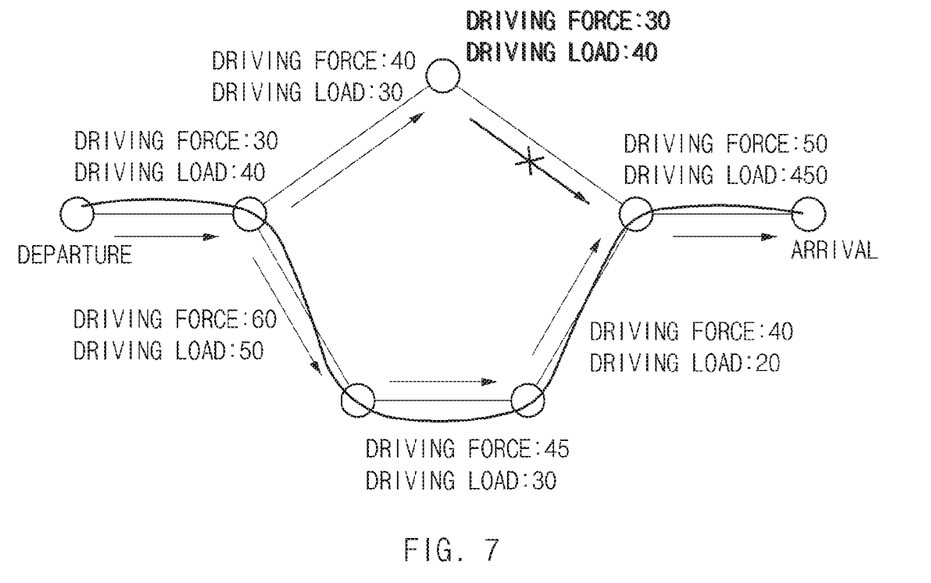
FIG. 7 is a drawing illustrating an example of displaying information about a probability of hill climbing for each section according to another embodiment of the present disclosure.

FIG. 7 is a drawing illustrating an example of displaying information about a probability of hill climbing for each section according to another embodiment of the present disclosure. Referring to FIG. 7, a driving force and a driving load may be displayed for each section of a route from a departure point to a destination point. A section where the driving force is less than the driving load may be displayed as it is impossible to drive.

Figure 8:
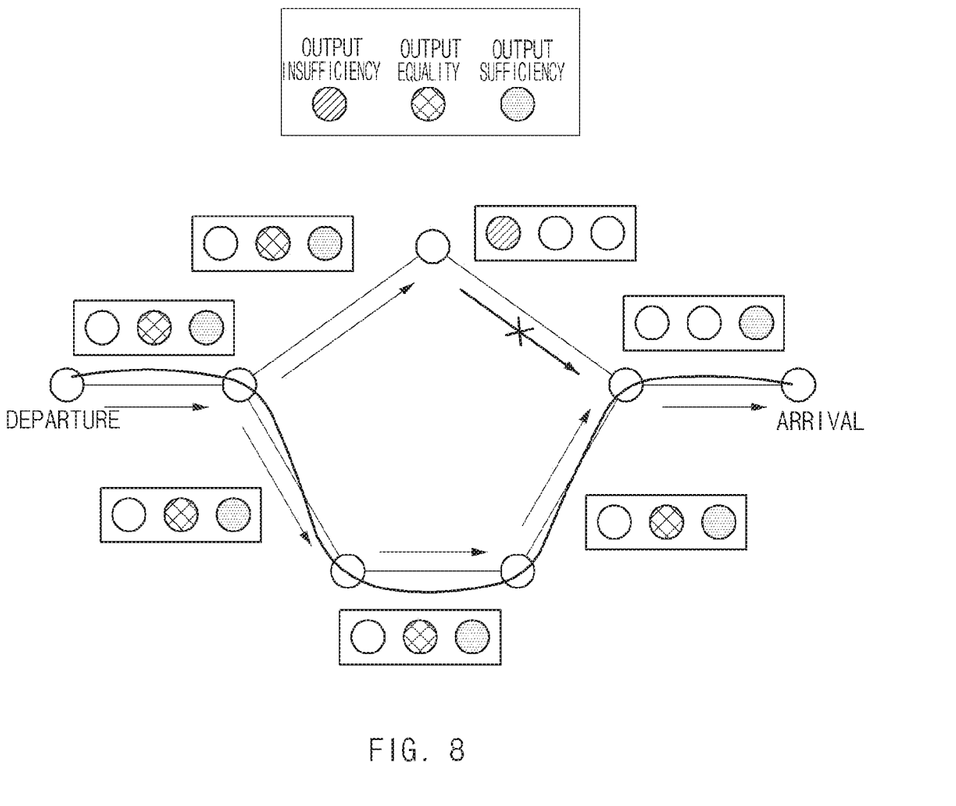
FIG. 8 is a drawing illustrating an example of displaying information about a probability of hill climbing for each section according to another embodiment of the present disclosure.

FIG. 8 is a drawing illustrating an example of displaying information about a probability of hill climbing for each section according to another embodiment of the present disclosure. Referring to FIG. 8, a state where the output is insufficient, a state where the output is equal, and a state where the output is sufficient may be displayed to differ in color of a traffic-light type of light to display whether it is possible to drive for each section of the route.

As such, an embodiment of the present disclosure may estimate a vehicle weight, may determine a probability of hill climbing according to the vehicle weight or whether it is possible to drive, and may display at least one of a probability of hill climbing for each section of the route, whether it is possible to drive, a driving force, or driving load information on a screen of a device in the vehicle, such that the driver may intuitively identify the probability of hill climbing for each section of the route while driving, whether it is possible to drive, the driving force, the driving load information, or the like. Thus, an embodiment of the present disclosure may guide the user to charge a commercial vehicle to reduce a driving time and may guide the driver along an optimal route according to the weight of the vehicle to increase satisfaction of the driver.

Figure 9:
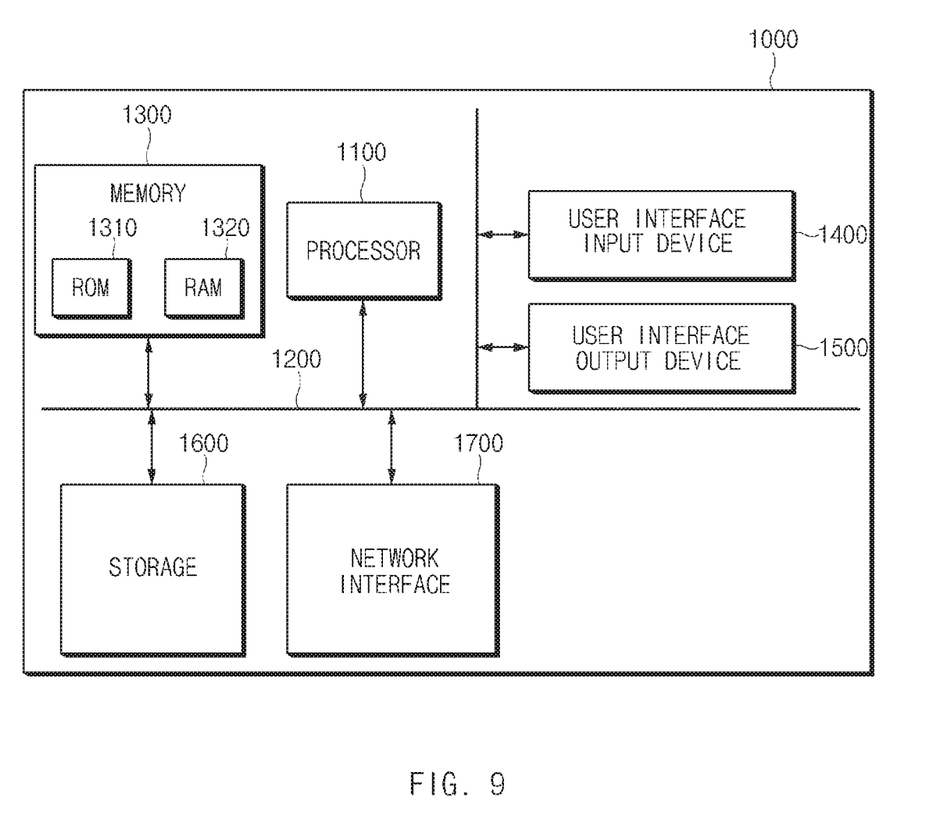
FIG. 9 is a block diagram illustrating a computing system according to an embodiment of the present disclosure.

FIG. 9 is a block diagram illustrating a computing system according to an embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may accurately predict a probability of hill climbing for each route section by estimating a weight of a commercial electric vehicle, thus guiding the user along an optimal driving route.

The present technology may display a probability of hill climbing according to a vehicle weight on a screen such that the user may intuitively recognize the probability of hill climbing, thus increasing convenience of the user.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. An apparatus for providing a route of an electric vehicle, the apparatus comprising:
    a processor configured to estimate a weight of a vehicle when guiding a user along a route to a destination, calculate a driving load for each route section using the estimated weight of the vehicle, calculate a driving force using motor torque, and determine a probability of hill climbing for each route section using the driving force and the driving load; and
    a display configured to be controlled by the processor to display at least one of a driving load for each route section or a probability of hill climbing according to a driving force for each route section;
    wherein the processor is configured to:
        provide a recommended route by determining the probability of hill climbing using the estimated weight of the vehicle and gradient of a road when an acceleration of the vehicle is greater than a reference value; and
        provide the recommended route using current battery information when an acceleration of the vehicle is less than the reference value.

2. The apparatus of claim 1, wherein the processor generates a recommended route based on road information and current battery information of the vehicle when the destination is input and guides the user along the generated recommended route.

3. The apparatus of claim 1, wherein the processor estimates the weight of the vehicle using a driving resistance value when the vehicle coasts down and acceleration of the vehicle, when the vehicle starts to drive.

4. The apparatus of claim 1, wherein the processor extracts grade information of the route based on a high definition map including grade information of a road.

5. The apparatus of claim 4, wherein the processor determines whether it is possible to drive to the destination, based on road information, battery information, and vehicle weight information.

6. The apparatus of claim 5, wherein the processor calculates the driving load for each route section using the grade information and the estimated weight of the vehicle, when it is possible to drive to the destination.

7. The apparatus of claim 1, wherein the processor calculates the driving force for each route section using maximum torque which is motor torque mapped to a battery available output based on a battery output map.

8. The apparatus of claim 7, wherein the processor calculates the driving force using the maximum torque, a dynamic tire radius, and a gear ratio.

9. The apparatus of claim 1, wherein the processor compares the driving force with the driving load per route composed of at least one section to determine the probability of hill climbing for each route section.

10. The apparatus of claim 9, wherein the processor determines that it is possible to perform hill climbing when the driving force is greater than the driving load and determines a corresponding section as a route where it is impossible to perform hill climbing when the driving force is less than or equal to the driving load.

11. The apparatus of claim 1, wherein the display separately displays at least one section included in the route to the destination and displays at least one of a driving force or a driving load in a numeric value per section.

12. The apparatus of claim 1, wherein the display separately displays at least one section included in the route to the destination and separately displays a state where the output is insufficient, a state where the output is equal, and a state where the output is sufficient.

13. A method for providing a route of an electric vehicle, the method comprising:
    providing a recommended route by determining the probability of hill climbing using the estimated weight of the vehicle and gradient of a road when an acceleration of the vehicle is less than a reference value, wherein the providing a recommended route by determining the probability of hill climbing including:
        estimating a weight of a vehicle, when guiding a user along a route to a destination;
        calculating a driving load for each route section using the estimated weight of the vehicle and grade information;
        calculating a driving force using motor torque;
        determining a probability of hill climbing for each route section based on the driving load and the driving force; and
        displaying at least one of a driving load for each route section or a probability of hill climbing according to a driving force for each route section.

14. The method of claim 13, wherein the estimating of the weight of the vehicle includes:
    estimating the weight of the vehicle using a driving resistance value when the vehicle coasts down and acceleration of the vehicle, when the vehicle starts to drive.

15. The method of claim 13, further comprising:
    generating a recommended route based on road information and current battery information of the vehicle when the destination is input and guiding the user along the generated recommended route; and
    determining whether it is possible to drive to the destination, based on road information, battery information, and vehicle weight information.

16. The method of claim 13, wherein the calculating of the driving load includes:

extracting grade information of the route based on a high definition map including grade information of a road; and calculating the driving load for each route section using the grade information and the estimated weight of the vehicle, when it is possible to drive to the destination.

17. The method of claim 13, wherein the calculating of the driving force includes:

calculating the driving force for each route section using maximum torque which is motor torque mapped to a battery available output based on a battery output map.

18. The method of claim 13, wherein the determining of the probability of hill climbing for each route section includes:

comparing the driving force with the driving load per route composed of at least one section to determine the probability of hill climbing for each route section.

19. The method of claim 13, wherein the displaying of the probability of hill climbing includes:

separately displaying at least one section included in the route to the destination; and displaying at least one of a driving force or a driving load in a numeric value per section.

20. The method of claim 13, wherein the displaying of the probability of hill climbing includes:

separately displaying at least one section included in the route to the destination; and separately displaying a state where the output is insufficient, a state where the output is equal, and a state where the output is sufficient.

* * * * *